(12) United States Patent
Mazyar et al.

(10) Patent No.: US 10,544,370 B2
(45) Date of Patent: Jan. 28, 2020

(54) ENHANCED BITUMEN RECOVERY, SEPARATION AND WATER CLARIFICATION PROCESS

(71) Applicant: Baker Hughes, a GE company, LLC, Houston, TX (US)

(72) Inventors: Oleg A. Mazyar, Katy, TX (US); Oleksandr Kuznetsov, Houston, TX (US); Valery Khabashesku, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 11 days.

(21) Appl. No.: 15/650,626

(22) Filed: Jul. 14, 2017

(65) Prior Publication Data

US 2018/0044595 A1 Feb. 15, 2018

Related U.S. Application Data

(60) Provisional application No. 62/375,121, filed on Aug. 15, 2016, provisional application No. 62/375,136, filed on Aug. 15, 2016.

(51) Int. Cl.
*C10G 1/04* (2006.01)
*C08L 95/00* (2006.01)

(52) U.S. Cl.
CPC ............ *C10G 1/047* (2013.01); *C08L 95/005* (2013.01)

(58) Field of Classification Search
CPC .................................. C10G 1/04; C10G 1/047
See application file for complete search history.

(56) References Cited

U.S. PATENT DOCUMENTS

| 4,946,597 | A | * | 8/1990 | Sury | .......................... B03B 9/02 |
| | | | | | 208/332 |
| 9,005,446 | B2 | | 4/2015 | Mazyar | |

(Continued)

FOREIGN PATENT DOCUMENTS

CA 2949609 A1 11/2015

OTHER PUBLICATIONS

Colloids, Colloids—Chemistry, "https://chem.libretexts.org/Textbook_Maps/Physical_and_Theoretical_Chemistry_Textbook_Maps/Supplemental_Modules_(Physical_and_Theoretical_Chemistry)/Physical_Properties_of_Matter/Solutions_and_Mixtures/Colloid", Accessed Sep. 19, 2018 (Year: 2017).*

(Continued)

*Primary Examiner* — Michelle Stein
(74) *Attorney, Agent, or Firm* — Mossman, Kumar & Tyler, P.C.

(57) ABSTRACT

A water extraction process for separating bitumen from tar sands comprises slurrying tar sands in water, mixing the aqueous slurry with a magnetic substance for a time sufficient to release bitumen from tar sands and to uniformly disperse the magnetic substance with the bitumen, and subjecting the resulting slurry to froth flotation for recovery of a bitumen product and production of sand tails. The magnetic substance may comprise a magnetic surfactant. Alternatively, the magnetic substance comprises a magnetic nanoparticle together with a frother having the characteristics of methyl-isobutyl-carbinol and can be mixed with the aqueous slurry by attrition scrubbing or by flotation cell mixing. The magnetic substance may be recovered for further reuse by applying a magnetic or electromagnetic field to the tailings. The process may suitably applied in both so-called hot water extraction processes as well in an (Continued)

"ambient" temperature (from about freezing to 35° C.) process.

9 Claims, 2 Drawing Sheets

(56) References Cited

U.S. PATENT DOCUMENTS

| | | | |
|---|---|---|---|
| 9,012,377 | B2 | 4/2015 | Khabashesku et al. |
| 2013/0140240 | A1* | 6/2013 | Mazyar ............... B01D 17/04 210/695 |
| 2014/0187449 | A1 | 7/2014 | Khabashesku et al. |
| 2015/0041368 | A1* | 2/2015 | Kersey ............... B03D 1/02 208/390 |

OTHER PUBLICATIONS

Masliyah, Jacob et al., "Understanding Water-Based Bitumen Extraction from Athabasca Oil Sands," Canadian Jnl of Chem. Engr., vol. 82, pp. 628-654 (2004).

Caiulo, Nick et al., "Carbon-Decorated FePt Nanoparticles", Advanced Functional Materials, vol. 17, pp. 1392-1396 (2007).

Luechinger, Norman A. et al., "Surfactant-Free, Melt-Processable Metal—Polymer Hybrid Materials: Use of Graphene as a Dispersing Agent", Advanced Materials, vol. 20, pp. 3044-3049 (2008).

Kowlgi, Krishna N.K., et al., "Synthesis of Magnetic Noble Metal (Nano)Particles", Langmuir, vol. 27, pp. 7783-7787 (2011).

Brown, Paul et al., "Magnetic Control Over Liquid Surface Properties With Responsive Surfactants," Angew. Chem. vol. 124, 4 pp. (2012).

AEROSIL 300, retrieved from https://www.aerosil.com/Ipa-productfinder/page/productsbytext/detail.html (2015).

AEROSOL R 974, retrieved from https://www.aerosil.com/Ipa-productfinder/page/productsbytxt/detail.html (2015).

Amiri, M.C., Efficient separation of bitumen in oil sand extraction by using magnetic treated process water:, Separation and Purification Technology, 47, 126-134, Jun. 2005.

* cited by examiner

ENHANCED BITUMEN RECOVERY, SEPARATION AND WATER CLARIFICATION PROCESS

CROSS-REFERENCES TO RELATED APPLICATIONS

This application claims the benefit of U.S. Provisional Patent Application No. 62/375,121 filed Aug. 15, 2016 and U.S. Provisional Patent Application No. 62/375,136 filed Aug. 15, 2016, both incorporated herein by reference in their entireties.

TECHNICAL FIELD

This disclosure relates generally to methods of obtaining a hydrocarbon material from a mined material, and to related stabilized emulsions. More particularly, the disclosure relates to methods of obtaining a hydrocarbon material from a materials such as oil sands or tar sands using a magnetic substance such as magnetically responsive surfactants or a colloidal dispersion including solid magnetic particles and a carrier fluid.

BACKGROUND

This invention relates generally to the separation of bitumen from tar sands and, more particularly, relates to the separation and recovery of bitumen from tar sands such as occur, for example, in the Athabasca tar sands (sometimes called oil sands) in Alberta, Canada, by flotation.

The original process for extraction of bitumen from the sands was developed by Dr. Karl Clark, working with the Alberta Research Council in the 1920s. Today, all of the producers doing surface mining, such as Syncrude Canada, Suncor Energy and Albian Sands Energy etc., use a variation of the Clark Hot Water Extraction (CHWE) process. In this process, the ores are mined using open-pit mining technology. The mined ore is then crushed for size reduction. Hot water at 50-80° C. is added to the ore and the formed slurry is transported using hydrotransport line to a primary separation vessel (PSV) where bitumen is recovered by flotation as bitumen froth.

The recovered bitumen froth typically consists of 60% bitumen, 30% water and 10% solids by weight. The recovered bitumen froth needs to be cleaned to reject the contained solids and water to meet the requirement of downstream upgrading processes. Depending on the bitumen content n the ore, between 90 and 100% of the bitumen can be recovered using modern hot water extraction techniques. After oil extraction, the spent sand and other materials are then returned to the mine, which is eventually reclaimed.

The economics of a process to recover bitumen by the CHWE process would benefit from an increased efficiency of the separation processes and from the recovery and reuse of at least some of the additives used to enhance the process.

The improved separation and recovery of bitumen from tar sands by the CHWE process would improve the feasibility and commercial viability of the process, especially if some of the additives used in the process could be recovered for reuse.

The separation of bitumen from tar sands at substantially ambient temperatures as described in U.S. Pat. No. 4,946,597, incorporated herein by reference in its entirety, obviated the need for the separation plant to be close to a supply of heat and permitted the separation of bitumen from the sands in proximity to the mining operation. This reduced the cost of transporting the solids, which comprise the bulk of the materials handled, since the separated sand and fine solids were now closer to disposal areas.

Conventional dry mining of tar sands for low-temperature bitumen extraction is accomplished by means of power shovels, draglines, bucketwheels and similar large earth moving equipment and the like. Wet mining can be accomplished in open pits by means of rotary excavators in combination with slurry pumps operating from a dredge or by waterjets in combination with mechanical equipment. Wet mining may also be used for deep deposits, by means of high pressure water jets in combination with slurry pumps in boreholes. An improved flotation process which operates at ambient temperatures, from above freezing to about 35° C., would provide the important advantage of permitting the choice of conventional dry mining techniques or wet mining techniques. The dry mining techniques employ hydraulic pipeline transportation of the mined tar sands to a separation plant. The wet mining techniques employ dredge mining, waterjetting or borehole mining with the option of hydraulic pipeline transportation of the tar sands to a separation plant or the processing of the tar sands on a dredge or adjacent a plurality of boreholes in an integrated mining and beneficiation operation with return of tailings directly to a tailings pond.

Dredge mining, waterjet mining in open pits or borehole mining of tar sands integrated with an improved ambient or low temperature flotation process would provide the important advantage of utilizing the shear energy consumed during the mining operation in water for initial disintegration of the tar sands and fragmentation of the bitumen for release from the sands preliminary to flotation.

The economics of a process to recover bitumen at low temperatures would also benefit from the recovery and reuse of at least some of the additives used to enhance the process.

The improved separation and recovery of bitumen from tar sands at ambient temperatures, i.e. "low temperatures" below about 35° C., would improve the feasibility and commercial viability of the process, especially if some of the additives used in the process could be recovered for reuse.

SUMMARY

In its broad aspect, there is provided a process for separating bitumen from tar sands comprises the steps of slurrying from about 5 to about 70% by weight tar sands in water and mixing this aqueous slurry in the presence of a magnetic substance such as magnetic surfactants and/or magnetic nanoparticles to enhance flotation of the bitumen, subjecting the slurry to which the magnetic substance such as magnetic surfactants and/or magnetic nanoparticles have been added to mixing for a time sufficient to release bitumen from tar sands and to uniformly disperse the magnetic substance such as magnetic surfactants and/or magnetic nanoparticles on the bitumen, and subjecting the resulting slurry to froth flotation for recovery of a bitumen product and production of sand tailings.

In an alternative aspect, there is provided a process for separating and recovering bitumen from tar sands which process includes slurrying about 15 to about 70% by weight tar sands in water to form an aqueous slurry, mixing said slurry in the presence of a magnetic substance in an amount effective to enhance flotation of the bitumen, subjecting said slurry to mixing for a time sufficient uniformly disperse the magnetic substance with the bitumen, subjecting the resulting conditioned slurry to a magnetic field; and recovering a bitumen product from the water.

In a different non-limiting embodiment, there is provided a process for separating and recovering bitumen from tar sands which process includes slurrying about 15 to about 70% by weight tar sands in water at a temperature in the range of from above about freezing to about 35° C. to form an aqueous slurry, mixing said slurry in the presence of a magnetic substance in an amount effective to enhance flotation of the bitumen, subjecting said slurry to which the magnetic substance has been added to mixing for a time sufficient to uniformly disperse the magnetic substance on the bitumen, subjecting the resulting conditioned slurry to a magnetic field and froth flotation, and recovering a bitumen product from the water.

BRIEF DESCRIPTION OF THE DRAWINGS

The process will now be described with reference to the accompanying drawing, in which.

DETAILED DESCRIPTION

Figure 1:
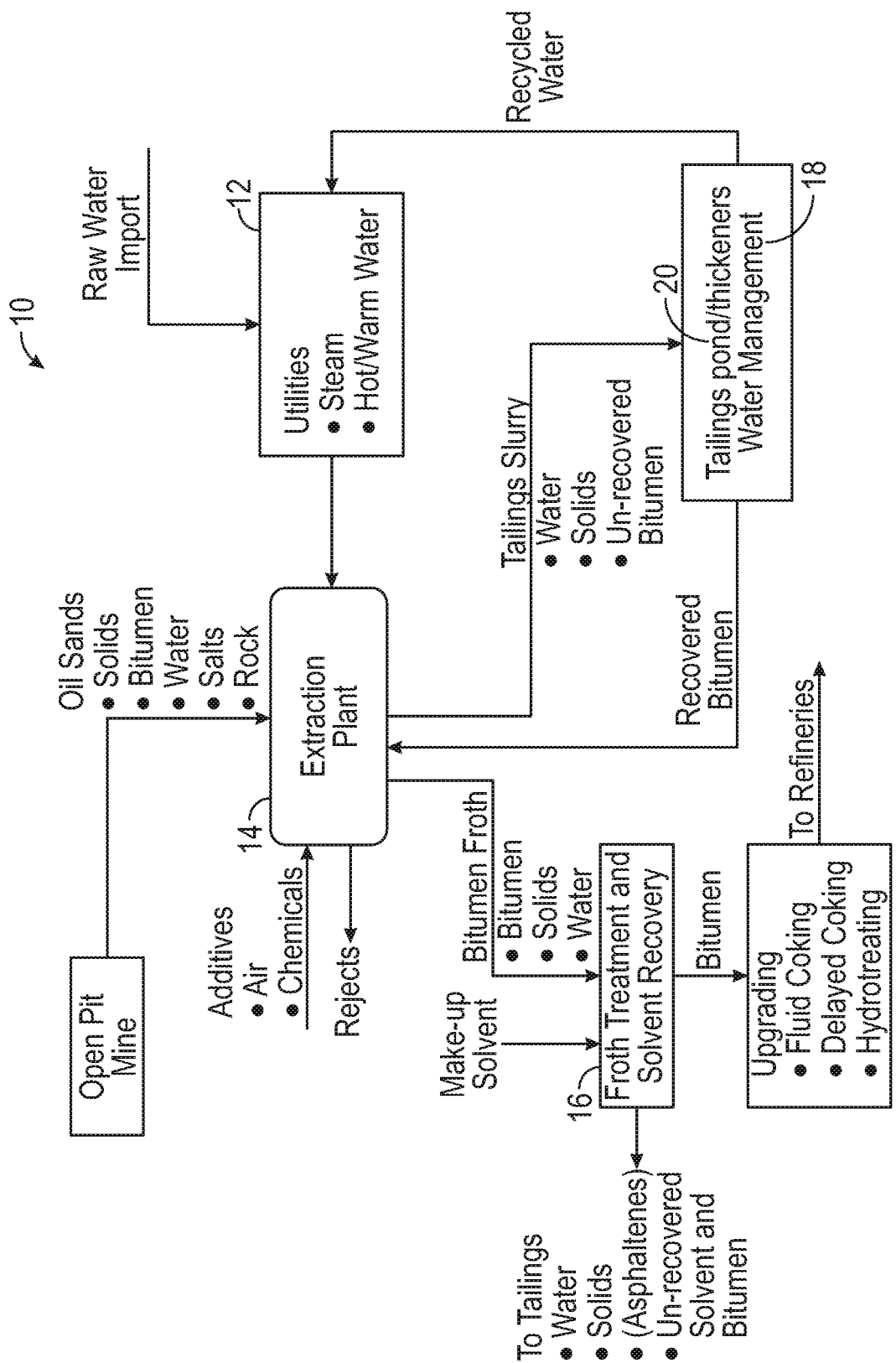
FIG. 1 generally illustrates the various points of the CHWE process where magnetic substance additions to both the initial slurry and to the flotation steps may be made.

It has been found that bitumen in tar sands can be beneficiated by froth flotation in both the low temperature extraction and the CHWE process by adding a magnetic substance such as magnetic surfactants and/or magnetic nanoparticles to a slurry of the tar sands in water to enhance the release of the bitumen particles from the sands and fine solids. It has been additionally found that by adding the magnetic substance such as magnetic surfactants and/or nanoparticles to the initial slurrying of the mined solids that the separation of the bitumen from the tailings is enhanced. Further, it has been found that by adding a magnetic substance such as magnetic surfactants and/or magnetic nanoparticles in the froth flotation separation step of the process, the release of fine sands from the bitumen is further enhanced resulting in higher, more "clean" bitumen yields. Additionally, it has been found that the addition of a magnetic substance such as magnetic surfactants and/or magnetic nanoparticles to the remaining water/solids mixture either in the separation vessel (flotation tank) or in a separate tailings tank will enhance the separation of solids from the water in the tailings. Finally, it has been found that with any of the above additions, the magnetic substance such as magnetic surfactants and/or magnetic nanoparticles, themselves, may be magnetically or electromagnetically removed from the tailings and processed for reuse in the initial and froth flotation steps of the continuing separation process. Settling of fine particles in the tailings discharge is also substantially enhanced as compared to conventional processes without the addition of a magnetic substance to significantly facilitate tailings and water disposal. The resulting bitumen flotation product can represent a recovery of up to 95% of the bitumen in the feed. The composition of the product, by weight, is generally 50 to 60% bitumen, about 10% solids, and the remainder water.

The following description provides specific details, such as specific material compositions and specific processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for recovering a hydrocarbon material from a mined material. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings (if present) and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context, it includes the degree of error associated with measurement of the given parameter).

As used herein with respect to a range, the term "independently" means that any lower threshold may be used together with any upper threshold to give a suitable alternative range. In other contexts "independently" means that in a plurality of components, different components in the same group may have different structures and/or properties. For example in a non-limiting instance, a plurality of particles may independently have different functional groups from one another.

As used in this specification, a "magnetic substance" shall include magnetic surfactants as defined hereinafter and/or magnetic nanoparicles as further defined hereinafter. It will be further understood that in adding a magnetic substance to any appropriate step in the bitumen recovery processes that either or both magnetic surfactants and magnetic nanoparticles may be added separately or in combination.

In one non-limiting embodiment, the magnetic substance comprises one or more magnetic surfactants. Magnetically responsive surfactants, hereinafter referred to a "magnetic surfactants" may be added at any mixing stage of any process followed by the application of magnetic field to improve the efficiency and the extent of bitumen recovery in the respective process. Magnetic surfactants are ionic liquids containing $FeCl_4^-$, $FeCl_3Br^-$, etc. anions. Their synthesis is readily achieved by mixing, for instance, an iron trihalide with the appropriate cationic surfactant. Surfactant properties of magnetically responsive ionic liquid are determined by cations having hydrophilic positively charged and polar part and hydrophobic part. Acceptable cations of ionic liquids which will provide surfactant properties to ionic liquids comprise, but are not necessarily limited to: imidazolium, pyrazolium, pyridinium, ammonium, piperidinium, pyrrolidinium, sulfonium, phosphonium, morpholinium, quinolinium, isoquinolinium, indolium, thiazolium, benzothiazolium, cyclopropenylium, derivatives thereof, or a combination comprising at least one of the foregoing. According to one non-limiting embodiment, the cation of the ionic liquid is functionalized with one or more groups such as hydrogen, linear or branched alkyl, fluorinated linear or branched alkyl, alkyloxy, cylcloalkyl, aryl, fluorinated aryl, alkaryl, aralkyl, aryloxy, aralkyloxy, alkenyl, alkynyl, amine, alkylamine, alkyleneamine, aryleneamine. Such groups can be, as appropriate given the group, unsubstituted or substituted with a heteroatom or halogen. Non-limiting examples of cations are alkyltrimethylammonium, 1-([4-amino-2-propyl-5-pyrimidinyl] methyl)-2-methylpyridinium, alkyldimethylbenzylammonium, diisobutylphenoxyethoxyethyl) dimethylbenzylammonium, benzyldimethyldodecylammonium, benzyldimethylhexadecylammonium, benzyldimethyltetradecylammoniimidazoliumum, cetylpyridinium, (2-hydroxyethyl) trimethylammonium, dimethyldioctadecylammonium, dodecylethyldimethylammonium, dodecyltrimethylammonium, ethylhexadecyldimethylammonium, acethydrazide trimethylammonium, hexadecyl(2-hydroxyethyl) dimethylammonium, hexadecylpyridinium, hexadecyltrimethylammonium, poly[(3-methyl-1-vinylimidazolium)-co-(1-vinylpyrrolidone)], methylbenzethonium, tetradecyltrimethylammonium, oxyphenonium, tetraheptylammonium, tetradecylammonium, N,N,N-tributyl-1-heptanaminium, N,N,N-tributyl-1-octanaminium, tricaprylylmethylammonium, tridodecylmethylammonium, trimethyloctadecylammonium, didodecyldimethylammonium, 1-dodecyl-3-methylimidazolium, 1-decyl-3-methyl imidazolium, 1-octyl-3-methylimidazolium, 1-hexyl-3-methylimidazolium, 1-butyl-3-methylimidazolium, 1-ethyl-3-methylimidazolium, trihexyl(tetradecyl)phosphonium, 1-hexyl-2-ethyl-3,5-dimethylpyridinium, 1-hexyl-2-propyl-3,5-diethylpyridinium, N-butylisoquinolinium, 1-hexyl-4-(4-methylpiperidino)pyridinium, 1-butyl-1-methylpiperidinium, 1,2,3-tris(diethylamino)cyclopropenylium, benzothiazolium, 2,3,3-trimethyl-1-propyl-3H-indolium, 4-dodecyl-1-[(2-methylthiazol-4-yl)methyl]pyridinium, 1-[(2-aminothiazol-4-yl)methyl]-2-decylpyridinium, 1-[(2-acetylaminothiazol-4-yl)methyl]-4-dodecylpyridinium.

Thus, magnetic surfactants are composed of ionic liquids, which are a combination of cations listed above and the suitable anions having the general formulae $MeCl_xBr_{4-x}^-$, $MeCl_xBr_{4-x}^{2-}$, where $x=0, 1, \ldots, 4$ wherein "Me" is a metal and non-limiting examples comprise $FeCl_4^-$, $FeCl_3Br^-$, $FeBr_4^-$, $CoCl_4^{2-}$, $CoBr_4^{2-}$, $NiCl_4^{2-}$, $MnBr_4^{2-}$.

In addition to magnetic surfactants, cationic surfactants represented by magnetically responsive magnetic liquids, nonionic surfactants may also be used since they do not disrupt cation-anion interactions of ionic liquids and can help to improve bitumen recovery. Nonionic surfactant additives comprise long chain alcohols such as fatty alcohols https://en.wikipedia.org/wiki/Fatty_alcohol, cetyl alcohol, stearyl alcohol, and cetostearyl alcohol (consisting predominantly of cetyl and stearyl alcohols), and oleyl alcohol, polyoxyethylene glycol alkyl ethers (Brij): $CH_3-(CH_2)_{10-16}-(O-C_2H_4)_{1-25}-OH$ such as octaethyleneglycol monododecyl ether and pentaethylene glycol monododecyl ether; polyalkyl ethers such as $CH_3-(CH_2)_{10-16}-(O-C_3H_6)_{1-25}-OH$; lucoside alkyl ethers: $CH_3-(CH_2)_{10-16}-(O\text{-Glucoside})_{1-3}-OH$ such as decyl glucoside, lauryl glucoside, octyl glucoside; polyoxyethylene glycol octylphenol ethers: $C_8H_{17}-(C_6H_4)-(O-C_2H_4)_{1-25}-OH$ such as Triton X-100; polyoxyethylene glycol alkylphenol ethers: $C_9H_{19}-(C_6H_4)-(O-C_2H_4)_{1-25}-OH$ such as Nonoxynol-9; glycerol alkyl esters such as glyceryl laurate; polyoxyethylene glycol sorbitan alkyl esters such as polysorbate; sorbitan alkyl esters such as Spans; cocamide MEA, cocamide DEA, dodecyldimethylamine oxide; block copolymers of polyethylene glycol and polypropylene glycol such as Poloxamers; polyethoxylated tallow amine (POEA) and ethylene oxide/propylene oxide block copolymer.

These magnetic ionic liquids are molecular liquids, rather than typical magnetic fluids (ferrofluids) which comprise magnetic colloidal particles dispersed in a carrier fluid. Therefore, using the magnetic ionic liquids rather than the typical ferrofluids in industrial processes eliminates the possibility of precipitation of magnetic nanoparticles, their non-uniform distribution in the carrier fluid, agglomeration, etc.

In another non-limiting embodiment, the magnetic substance comprises magnetic nanoparticles. The magnetic nanoparticles may be added during slurrying of the tar sands in water or after slurrying of the tar sands in water before or during mixing of the slurry or to remove solid particles from the tailings.

The slurry with added magnetic substance is subjected as necessary to mixing such as by attrition scrubbing or flotation cell mixing by an impeller at a speed in the range of 1500 to 3200 rpm, in one non-restrictive version in a preliminary step to the flotation step.

The slurry may contain up to 70% by weight tar sands and may be adjusted by dilution to 15 to 30% by weight tar sands in water prior to froth flotation. Froth flotation is enhanced by an additional introduction of a magnetic substance and can take place in a single stage or in two or more stages. Effective slurrying and mixing of the tar sands at low temperatures fragments and liberates the bitumen from the inorganic solids to improve separation of the bitumen from the sand and the fines components of the tar sands.

The use of a magnetic substance allows the recovery from the tailings by magnetic or electromagnetic exposure of the tailings and collection of the magnetic substance which may be processed for reuse in the mining and froth flotation steps of the process. The term "magnetic nanoparticles" as used in this specification includes those nanoparticle materials that are naturally magnetic in addition to nanoparticles that may be chemically or otherwise altered during or prior to the recovery step to become magnetic.

FIG. 1 illustrates schematically the process of the present invention for bitumen separation from tar sands by the CHWE process. Despite some differences in detail, the concept of the hot water process as described by Clark is used in commercial operations by different oil sand operators. As defined herein, hot water is at a temperature between about 50 and about 80° C. A flow diagram of oil sand mining to bitumen upgrading is shown in FIG. 1. Each box of FIG. 1 identifies a unit plant operation that is well integrated within the whole oil sand extraction and with upgrading when it is available in the proximity of the extraction plant.

The basic units of bitumen production are shown in FIG. 1 and include: the mining process 10, the utilities 12, the extraction process 14, the froth flotation treatment process 16, water clarification 18 and tailings ponds/thickener 20. It is clear that all the units are inter-related. The mining operation affects extraction and in turn the extraction operation affects the upgrading operation. Through proper process integration and addition of the magnetic substances of this invention, bitumen may be efficiently economically recovered with minimum adverse environmental impact. Maximization of product recovery should always encompass the three basic operations: mining, extraction and upgrading.

Magnetic substances in accordance with this invention for enhanced selective flotation of bitumen from the sand in the tar sands may be added to the tar sands slurry in the water supply to slurry pumps feeding into the extraction process 14, to the slurry during subsequent mixing of the tar sands during transportation by pipeline to a separation plant, or may be added to the slurry immediately prior to the froth flotation process 16.

When used as the magnetic substance, the magnetic nanoparticles may be ferromagnetic, superparamagnetic or paramagnetic. Magnetic nanoparticles may be nano- and micro-particles. The term superparamagnetic is applicable only to nanoparticles of a sufficiently small size. The magnetic nanoparticles may be added to the slurry after introduction of the tar sands slurry feed, or can be added with the tar sands slurry feed. The tar sands slurry feed can be subjected to mixing, as necessary, for a time sufficient to release bitumen from the tar sands and to uniformly disperse the magnetic nanoparticles on the bitumen prior to flotation 16. Bitumen froth overflows as product while the flotation underflow is subjected to classifying for removal of free sands. Tar sands lumps and the like unbroken tar sands are subjected to attrition scrubbing, such as by tumbler attrition scrubbing, to disintegrate the lumps, and the liberated bitumen plus sands are added to the sands from classifying step for gravity separation. Bitumen from gravity separation is added to the bitumen product from flotation 16 for subsequent upgrading.

Magnetic nanoparticles having no electric charge, or negative charge, or positive charge may be added during the first stage at any time or mixing, before or during the hydrotransport to separation vessel, and/or at the second stage, in a non-limiting instance of a separation and/or a flotation stage. The nanoparticles serve to separate bitumen from water when magnetic field is turned on, so in another non-limiting embodiment they may be formulated to have some affinity to bitumen that will help them to aggregate at the interface between bitumen and water. Magnetic nanoparticles suitable for bitumen-water separation (having some affinity to bitumen) may be alternatively or additionally introduced to a conditioned slurry, a primary separation cell, a primary flotation cell and/or a secondary flotation cell.

Once the bitumen is essentially removed from the separation vessel another type of magnetic nanoparticles and/or magnetic surfactants may be added to the remaining water/solids mixture either in the separation tank (flotation vessel) 16 or in the separate tailings treatment tank 18 to magnetically remove solids from the tailings. Since the solids that remain in tailings are usually negatively charged, in one non-limiting embodiment the magnetic nanoparticles may be positively charged. Thus, positively charged magnetic nanoparticles aggregate at the interfaces between negatively charged solids and water. This enables the removal of solids from water using magnetic field. Neutral magnetic particles will also work, but maybe not as effectively as positively charged particles. In another non-restrictive embodiment, positively charged or neutral magnetic nanoparticles suitable for solids removal from tailings may be added to a thickener, a warm water tank, and/or a tailing pond.

Figure 2:
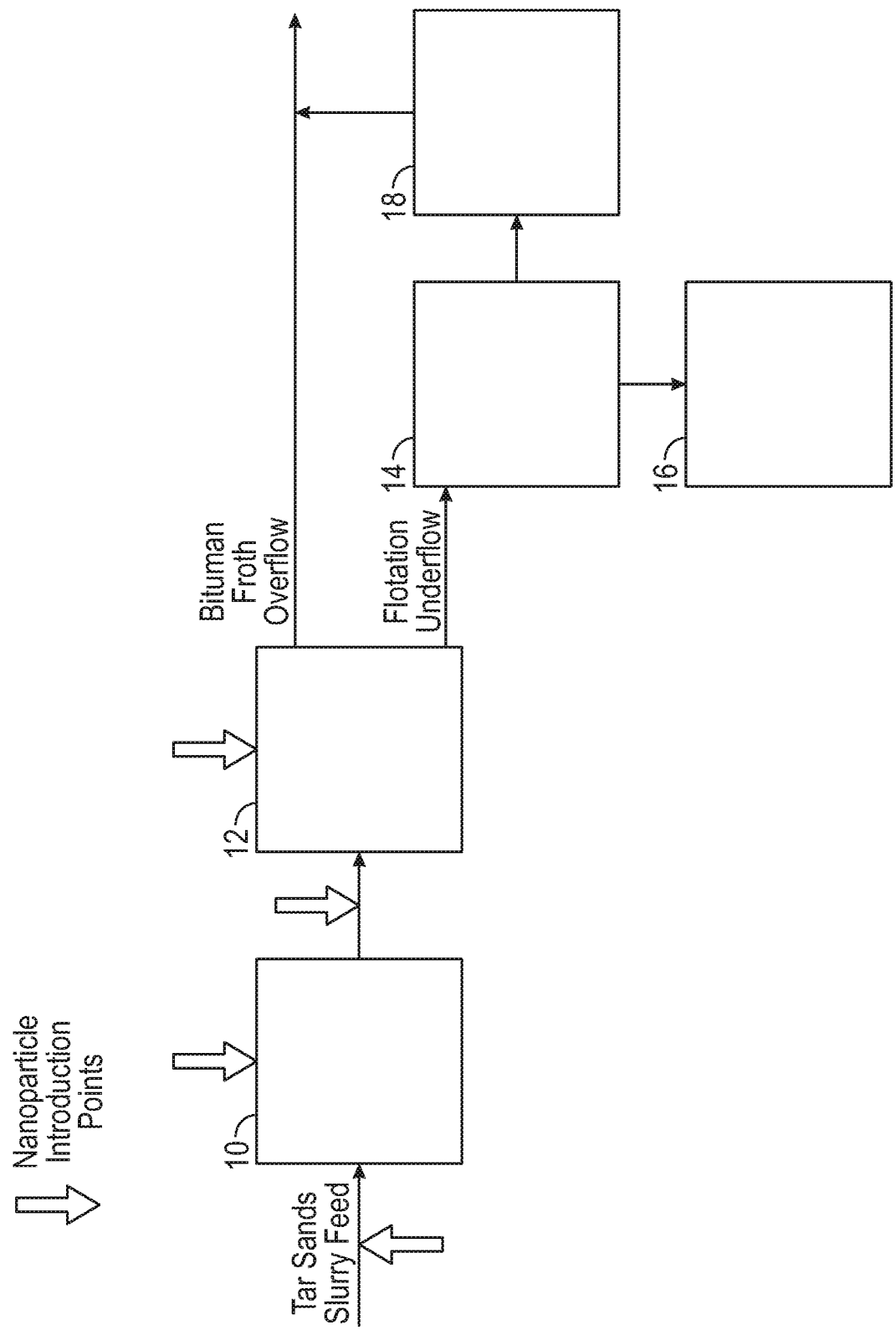
FIG. 2 shows the various points of magnetic substance additions to both the initial slurry and to the flotation steps of a low temperature extraction process.

FIG. 2 illustrates schematically another non-limiting embodiment of the use of a magnetic substance in processes for low temperature bitumen separation from tar sands mined by dry mining, hydraulic dredge mining or by water-jet surface or borehole mining. In dredge mining of the tar sands, a pond can be formed by water flooding a pit in the tar sands and the tar sands mined by a rotary cutter or bucket wheel supported by a dredge floating on the pond. The tar sands are sheared by the mining device and effectively slurried with water in a slurry pump under attrition scrubbing conditions to particulate the tar sands and to liberate the bitumen. In the use of high pressure waterjets in open pits and in boreholes formed in situ in the tar sands, jets of water or water containing a conditioning agent disintegrates the tar sands for slurrying of the tar sands and the slurry is collected and pumped through a pipeline by means of a slurry pump to produce desired attrition scrubbing conditions. It is also contemplated that the tar sands can be dry mined by conventional mining equipment and slurried with water such as in a slurry pump for transport through a pipeline with attendant attrition scrubbing.

The resulting slurry can contain up to 70% by weight tar sands, higher densities of tar sands in water being suitable in one non-limiting embodiment for effective attrition scrubbing of the tar sands during passage of the tar sands through slurry pumps and pipelines for disintegration of the tar sands and release of the bitumen.

In one non-restrictive version the temperature of the slurry during the operation of the process is as low as possible and close to the tar sands temperature as permitted by ease of separation and optimum bitumen recovery to minimize energy costs. It has been found that the operation of the process at a temperature in the range of from above freezing to about 35° C., alternatively, in the range of about 2° to about 35° C., permits particulation and release of the bitumen from the sands and fine solids of the tar sands. The amount of mechanical shear energy, such as produced by attrition scrubbing during the mining operation and during slurrying and pipelining of the tar sands in water, particularly in the temperature range of about 2 to about 35° C., must be increased at the low end of the said temperature range and can be reduced at the upper end of the said temperature range, as will become evident as the description proceeds.

A conditioning agent and magnetic nanoparticles for enhanced selective flotation of bitumen from the sand in the tar sands may be added to the tar sands slurry in the water supply to slurry pumps, to the water in the high pressure water jets during open pit or borehole mining, to the slurry during subsequent mixing of the tar sands during transportation by pipeline to a separation plant, or may be added to the slurry immediately prior to the froth flotation process. The magnetic nanoparticles may be ferromagnetic, superparamagnetic or paramagnetic. Magnetic nanoparticles may be nano- and micro-particles. The term superparamagnetic is applicable only to nanoparticles of a sufficiently small size.

The conditioning agent and magnetic nanoparticles may be added to the slurry after introduction of the tar sands slurry feed to the embodiment of the process illustrated in FIG. 2, as depicted, or can be added with the tar sands slurry feed. The tar sands slurry feed can be subjected to mixing 10, as necessary, for a time sufficient to release bitumen from the tar sands and to uniformly disperse the conditioning agent and magnetic nanoparticles on the bitumen prior to flotation 12. Bitumen froth overflows as product while the flotation underflow is subjected to classifying 14 for removal of free sands. Tar sands lumps and the like unbroken tar sands are subjected to attrition scrubbing, such as by tumbler attrition scrubbing 16, to disintegrate the lumps, and the liberated bitumen plus sands are added to the sands from classifying step 14 for gravity separating 18. Bitumen from gravity separating 18 is added to the bitumen product from flotation 12 for subsequent upgrading.

In any of the above illustrated processes, magnetic nanoparticles having no electric charge, or negative charge, or positive charge may be added during the first stage at any time or mixing, before or during the hydrotransport to separation vessel, and/or at the second stage, in a non-limiting instance of a separation and/or a flotation stage. The nanoparticles serve to separate bitumen from water when a magnetic field is applied, so in another non-limiting embodiment they may be formulated to have some affinity to bitumen that will help them to aggregate at the interface between bitumen and water. Magnetic nanoparticles suitable for bitumen-water separation (having some affinity to bitumen) may be alternatively or additionally introduced to a conditioned slurry, a primary separation cell, a primary flotation cell and/or a secondary flotation cell.

Once the bitumen is essentially removed from the separation vessel, another type of magnetic substance, including magnetic surfactants and/or magnetic nanoparticles may be added to the remaining water/solids mixture either in the separation tank (flotation vessel) or in the separate tailings treatment tank to magnetically remove solids from the tailings. Since the solids that remain in tailings are usually negatively charged, in a non-limiting embodiment the magnetic substance may be positively charged. Thus, a positively charged magnetic substance aggregates at the interfaces between negatively charged solids and water. This enables the removal of solids from water using magnetic field. A neutral magnetic substance will also work, but maybe not as effectively as positively charged magnetic substances. In another non-restrictive embodiment, a positively charged or neutral magnetic substance suitable for solids removal from tailing may be added to a thickener, a warm water tank, and/or a tailing pond.

As a non-limiting example, at least a portion of the magnetic nanoparticles may be formed of and include magnetic nanoparticles can be composed of iron, cobalt, nickel, as well as the rare earth metals including gadolinium, dysprosium, praseodymium, holmium, holmium/yttrium alloy, Sm alloys with Co, Fe, Cu, and Zr, alloys of neodymium, iron and boron, iron alloys which in addition to iron are composed primarily of aluminum, nickel and cobalt, iron oxide, ferrites including $ZnFe_2O_4$, $BaFe_{12}O_{19}$, $SrFe_{12}O_{19}$, $CoFe_2O_4$, manganese-zinc ferrite, nickel-zinc ferrite, and the like. Magnetic nanoparticles can be iron, iron-carbon, and/or iron-nitrogen nanoparticles synthesized or prepared by chemical vapor condensation as described in Chul-Jin Choi, Byoung-Kee Kim, Oleg Tolochko and Li-Da, "Preparation and Characterization of Magnetic Fe, Fe/C and Fe/N Nanoparticles Synthesized by Chemical Vapor Condensation Process", *Reviews on Advanced Materials Science*, vol. 5, pp. 487-492 (2003), or any other known or suitable process for creating magnetic nanoparticles, e.g., arc discharge, mechanical alloying, hydrogen plasma metal reaction, etc. The nanoparticles may be magnetic noble metal nanoparticles, e.g., fabricated by conventional noble metal nanoparticle creation processes in the presence of a magnetic field as described in Krishna N. K. Kowlgi, Ger J. M. Koper, Stephen J. Picken, Ugo Lafont, Lian Zhang, and Ben Norder, "Synthesis of Magnetic Noble Metal (Nano) Particles", *Langmuir*, vol. 27, pp. 7783-7787 (2011). In another embodiment the magnetic nanoparticles can be carbon-decorated Co and/or FePt nanoparticles prepared as described in Norman A. Luechinger, Norman Booth, Greg Heness, Sri Bandyopadhyay, Robert N. Grass, and Wendelin J. Stark, "Surfactant-Free, Melt-Processable Metal—Polymer Hybrid Materials: Use of Graphene as a Dispersing Agent", *Advanced Materials*, vol. 20, pp. 3044-3049 (2008) and in Nick Caiulo, Chih Hao Yu, Kai Man K. Yu, Chester C. H. Lo, William Oduro, Benedicte Thiebaut, Peter Bishop, and Shik Chi Tsang, "Carbon-Decorated FePt Nanoparticles", *Advanced Functional Materials*, vol. 17, pp. 1392-1396 (2007), respectively. Magnetic nanoparticles can be encapsulated within the shell, which protects the magnetic core from corrosive and oxidizing agents and enhance or reduce their affinities to particular fluids or surfaces. Moreover, coatings on magnetic nanoparticles can enable further functionalization of these nanoparticles with hydrophilic and/or hydrophobic functional groups, if necessary, to adjust their wettability by the fluids and to maintain their colloidal stability. For example, carbon coating generally improves the dispersal of inorganic nanoparticles within hydrophobic liquids and can enable further functionalization. Carbon nitride coating can enhance nanoparticles' affinity to bitumen, kerogen and asphaltenes. Silica and alumina coatings can enable effective functionalization of nanoparticles with alkoxysilanes, chlorosilanes, and cyclic azasilanes having strained ring structure with Si and N centers adjacent to each other.

In addition to the use of naturally magnetic nanoparticles, this disclosure contemplates the chemical alteration of non-magnetic nanoparticles to magnetic nanoparticles. Non-magnetic nanoparticles may be made magnetic by adding magnetic anions. To keep negatively charged magnetic anions near the core of the particle, the core of the particle must be positively charged by adding positively charged functional groups such as by adding functional groups containing positively charged imidazolium, pyrazolium, pyridinium, ammonium, piperidinium, pyrrolidinium, sulfonium, phosphonium, morpholinium, quinolinium, isoquinolinium, indolium, thiazolium, benzothiazolium, cyclopropenylium cations, derivatives thereof, or a combination comprising at least one of the foregoing and amines (the last one can be charged in acidic environment) to turn the non-magnetic nanoparticles into magnetic or magnetic nanoparticles into even more magnetic nanoparticles. Functional groups covalently or non-covalently attach to nanoparticles (non-magnetic, or magnetic nanoparticles), the functional groups include imidazolium, pyridinium, sulfonium, phosphonium and other positively charged moieties, only in combination with anions having magnetic properties (having general formulae $MeCl_xBr_{4-x}^-$, $MeCl_xBr_{4-x}^{2-}$, where x=0, 1, . . . , 4, and Me is Fe, Co, Ni and Mn). Thus, a non-magnetic nanoparticle may be changed into a magnetic nanoparticle by functionalizing the nanoparticles with magneto-responsive ionic liquids. These chemically altered nanoparticles may then be applied as any other magnetic nanoparticle having affinity either to bitumen or to fines, depending on their surface composition and functional group composition.

At least some of the solid nanoparticles may comprise composite particles. As used herein, the term "composite nanoparticle" means and includes a particle including at least two constituent materials that remain distinct on a micrometric level while forming a single particle. For example, the composite nanoparticle may include a core of a first material at least partially encapsulated (e.g., covered, surrounded, etc.) by a shell of a second material. As a non-limiting example, at least a portion of the solid nanoparticles may be formed of and include at least one shell of a metal oxide (e.g., silica, alumina, titania, ceria, zirconia, germania, magnesia, an iron oxide, zinc oxide, etc.), a metal carbide (e.g., silicon carbide), and a metal nitride (e.g., silicon nitride) at least partially surrounding a core formed of and including at least one other material (e.g., a polymer material, a crystalline material, an organic material, an inorganic material, a metallic material, a magnetic material, a ceramic material, etc.). The shell may be attached to the core through at least one of chemical bonds with atoms of the core, ion-dipole interactions, π-cation and π-π interactions, and surface adsorption (e.g., chetnisorption, and/or physisorption).

At least some of the solid nanoparticles may be functionalized to limit and/or enhance interactions between the solid nanoparticles and different components of a mined material. For example, the solid nanoparticles may be configured to exhibit an affinity for at least one material provided to and/or already present within the mined material. Such an affinity may assist with the dispersion of the solid nanoparticles within a carrier fluid (e.g., an aqueous material) of the colloidal dispersion, may assist in the removal of a hydrocarbon material from surfaces (e.g., solid surfaces, liquid surfaces) of the mined material, and/or may assist in the stabilization of mixtures (e.g., emulsions, such as hydrocarbon material dispersed in aqueous material emulsions, or aqueous material dispersed in hydrocarbon material emulsions) formed from at least a portion of the mined material. The solid nanoparticles may be structured and formulated (e.g., through one or more functional groups) to be at least partially hydrophilic, amphiphilic, oxophilic, lipophilic, and/or oleophilic. As a non-limiting example, hydrophilic functional groups may enable the solid nanoparticles to more readily stabilize hydrocarbon-water and/or hydrocarbon-brine emulsions in which the continuous phase is water or brine. In some non-restrictive embodiments, the solid nanoparticles are structured and formulated to exhibit an affinity for both a solid surface of the mined material and a hydrocarbon material present within the mined material. Such an affinity may, for example, enable the solid nanoparticles to gather (e.g., agglomerate) at an interface between the solid surface of the mined material and the hydrocarbon material to assist with removing the hydrocarbon material from the solid surface of the mined material. Any portions (e.g., cores, shells, etc.) of the solid nanoparticles may be functionalized to exhibit desired affinities and/or aversions for different materials.

Non-limiting examples of suitable functional groups for modifying the affinities and/or aversions of the solid nanoparticles for different materials include, but are not necessarily limited to, carboxy groups; epoxy groups; ether groups; ketone groups; amine groups; hydroxy groups; alkoxy groups; alkyl groups, such as methyl, ethyl, propyl, butyl, pentyl, hexyl, octyl, dodecyl, and/or octadecyl groups; aryl groups, such as phenyl, and/or hydroxyphenyl groups; aralkyl groups; alkaryl groups, such as benzyl groups attached via the aryl portion (e.g., 4-methylphenyl, 4-hydroxymethylphenyl, or 4-(2-hydroxyethyl)phenyl, and/or aralkyl groups attached at the benzylic (alkyl) position, such as in a phenylmethyl and 4-hydroxyphenylmethyl groups, and/or attached at the 2-position, such as in a phenethyl and 4-hydroxyphenethyl groups); lactone groups; functionalized polymeric groups, such as acrylic chains having carboxylic acid groups, hydroxyl groups, and/or amine groups; functionalized oligomeric groups; and/or combinations thereof. The functional groups may be attached to the solid particles directly, and/or through intermediate functional groups (e.g., carboxy groups, amino groups, etc.) by way of one or more conventional reaction mechanisms (e.g., amination, nucleophilic substitution, oxidation, Stille coupling, Suzuki coupling, diazo coupling, organometallic coupling, etc.). In further embodiments, at least some of the solid nanoparticles are formulated to exhibit desired affinities and/or aversions for different materials without having to perform additional processing acts to attach functional groups thereto. For example, one or more portions (e.g., shells, cores, etc.) of at least some of the solid nanoparticles may already exhibit desired affinities and/or aversions for different materials without having to perform additional functionalization acts.

Each of the solid nanoparticles may have substantially the same surface modification (e.g., shell, surface functionalization, combination thereof, etc.), the surface modification of at least one of the solid nanoparticles may be different than the surface modification of at least one other of the solid nanoparticles, or at least one of the solid nanoparticles may have substantially no surface modification. In some non-restrictive embodiments, each of the solid nanoparticles may be substantially free of surface modifications. In additional non-limiting embodiments, each of the solid nanoparticles has substantially the same surface modification. In further non-restrictive embodiments, a portion of the solid nanoparticles have substantially the same surface modification, and another portion of the solid nanoparticles have a different surface modification. In yet further non-limiting embodiments, a portion of the solid nanoparticles have at least one type of surface modification, and another portion of the solid nanoparticles are substantially free of surface modifications.

The size and shape of each of the solid nanoparticles may be selected to facilitate the formation of a colloidal dispersion, and may also be selected based on the characteristics of the mined material. For example, the solid nanoparticles may be sized and shaped based on one or more properties (e.g., molecular weight, density, viscosity, etc.) of a hydrocarbon material (e.g., bitumen) contained within the interstitial spaces of the mined material. Relatively smaller nanoparticles may, for example, be selected to increase the stability of an emulsion including an aqueous material (e.g., an aqueous alkaline material) and a hydrocarbon material from the mined material. In some non-restrictive embodiments, the solid nanoparticles may comprise solid nanoparticles. As used herein the term "nano particle" means and includes a particle having an average particle width or diameter of less than about 1 micrometer (μm) (i.e., 1000 nanometers). Each of the solid nanoparticles may, for example, independently have an average particle width or diameter of less than or equal to about 500 nm, alternatively less than or equal to about 250 nm, or in another non-limiting embodiment less than or equal to about 100 nm. In some non-restrictive embodiments, each of the solid nanoparticles independently has an average particle width or diameter of within a range of from about 1 nm independently to about 100 nm. In additional embodiments, one or more of the solid particles may have an average particle width or diameter greater than or equal to about 1 such as within a range of from about 1 μm independently to about 25 μm, alternatively from about 1 μm independently to about 20 μm, or in another non-restrictive embodiment from about 1 μm independently to about 10 μm. Furthermore, each of the solid particles may independently exhibit a desired shape, such as a spherical shape, a hexahedral shape, an ellipsoidal shape, a cylindrical shape, a conical shape, or an irregular shape. In some embodiments, each of the solid particles has a substantially spherical shape.

The solid nanoparticles may be monodisperse, wherein each of the solid particles exhibits substantially the same size, shape, and material composition, or may be polydisperse, wherein the solid particles include a range of sizes, shapes, and/or material compositions. In some embodiments, each of the solid nanoparticles comprises a silica nanoparticle having substantially the same size and the same shape as each other of the solid particles. In additional non-limiting embodiments, each of the solid nanoparticles comprises a core of a first material (e.g., a polymer material, a crystalline material, an organic material, an inorganic material, a metallic material, a magnetic material, a ceramic material, etc.) covered with a shell of a second material (e.g., a metal oxide, such as silica, alumina, titania, ceria, zirconia, germania, magnesia, an iron oxide, zinc oxide; a metal carbide, such as silicon carbide; a metal nitride, such as silicon nitride; etc.), and has substantially the same size and the same shape as each other of the solid nanoparticles. In further non-restrictive embodiments, at least one of the solid nanoparticles comprises a different size, a different shape, and/or a different material composition than at least one other of the solid nanoparticles.

In another non-limiting embodiment, magnetic surfactants may be employed, which may include imidazolium, pyrazolium, pyridinium, ammonium, piperidinium, pyrrolidinium, sulfonium, phosphonium, morpholinium, quinolinium, isoquinolinium, indolium, thiazolium, benzothiazolium, cyclopropenylium cations, derivatives thereof, or a combination comprising at least one of the foregoing, and anions having general formulae $MeCl_xBr_{4-x}^-$, $MeCl_xBr_{4-x}^{2-}$, where x=0, 1, . . . , 4, and Me is Fe, Co, Ni and Mn. According to a non-restrictive embodiment, the cation of the magnetic surfactant is functionalized with one or more groups such as hydrogen, linear or branched alkyl, fluorinated linear or branched alkyl, alkyloxy, cycloalkyl, aryl, fluorinated aryl, alkaryl, aralkyl, aryloxy, aralkyloxy, alkenyl, alkynyl, amine, alkylamine, alkyleneamine, aryleneamine. Such groups can be, as appropriate given the group, unsubstituted or substituted with a heteroatom or halogen. Non-limiting examples of cations are alkyltrimethylammonium, 1-([4-amino-2-propyl-5-pyrimidinyl]methyl)-2-methylpyridinium, alkyldimethylbenzylammonium, diisobutylphenoxyethoxy-ethyl)dimethylbenzylammonium, benzyldimethyldodecylammonium, benzyldimethylhexadecylammonium, benzyldimethyltetradecylammoniimidazoliumum, cetylpyridinium, (2-hydroxyethyl)trimethylammonium, dimethyldioctadecylammonium, dodecylethyldimethylammonium, dodecyltrimethylammonium, ethylhexadecyldimethylammonium, acethydrazide trimethylammonium, hexadecyl(2-hydroxyethyl)dimethylammonium, hexadecylpyridinium, hexadecyltrimethylammonium, poly[(3-methyl-1-vinylimidazolium)-co-(1-vinylpyrrolidone)], methylbenzethonium, tetradecyltrimethylammonium, oxyphenonium, tetraheptylammonium, tetradecylammonium, N,N,N-tributyl-1-heptanaminium, N,N,N-tributyl-1-octanaminium, tricaprylylmethylammonium, tridodecylmethylammonium, trimethyloctadecylammonium, didodecyldimethylammonium, 1-dodecyl-3-methylimidazolium, 1-decyl-3-methyl imidazolium, 1-octyl-3-methylimidazolium, 1-hexyl-3-methylimidazolium, 1-butyl-3-methylimidazolium, 1-ethyl-3-methylimidazolium, trihexyl(tetradecyl)phosphonium, 1-hexyl-2-ethyl-3,5-dimethylpyridinium, 1-hexyl-2-propyl-3,5-diethylpyridinium, N-butylisoquinolinium, 1-hexyl-4-(4-methylpiperidino)pyridinium, 1-butyl-1-methylpiperidinium, 1,2,3-tris(diethylamino)cyclopropenylium, benzothiazolium, 2,3,3-trimethyl-1-propyl-3H-indolium, 4-dodecyl-1-[(2-methylthiazol-4-yl)methyl]pyridinium, 1-[(2-aminothiazol-4-yl)methyl]-2-decylpyridinium, 1-[(2-acetylaminothiazol-4-yl)methyl]-4-dodecylpyridinium.

It will be understood that modifications can be made in the embodiments of the invention illustrated and described herein without departing from the scope and purview of the invention as defined by the appended claims. However, it will be evident that various modifications and changes can be made thereto without departing from the broader scope of the invention as set forth in the appended claims. Accordingly, the specification is to be regarded in an illustrative rather than a restrictive sense. For example, specific combinations of tar sands, slurries, magnetic nanoparticles, frothing agents, and other components falling within the claimed parameters, but not specifically identified or tried in a particular method or slurry, are anticipated to be within the scope of this invention. Similarly, it is expected that the bitumen recovery methods may be successfully practiced using somewhat different sequences, temperature ranges, and proportions than those described or exemplified herein.

The present invention may suitably comprise, consist of or consist essentially of the elements disclosed and may be practiced in the absence of an element not disclosed. For instance, there may be provided a process for separating and recovering bitumen from tar sands which consists essentially of or consists of slurrying about 15 to about 70% by weight tar sands to form an aqueous slurry; mixing said slurry in the presence of magnetic nanoparticles to enhance flotation of the bitumen; subjecting said slurry to mixing for a time sufficient to release bitumen from the tar sands and to uniformly disperse the magnetic nanoparticles on the bitumen; and subjecting the resulting slurry to froth flotation for recovery of a bitumen product and productions of sand tails.

Similarly, in another non-limiting embodiment of the invention, there may be provided a process for separating and recovering bitumen from tar sands which consists essentially of or consists of slurrying about 15 to about 70% by weight tar sands to form an aqueous slurry; mixing said slurry in the presence of a magnetic surfactant to enhance flotation of the bitumen; subjecting said slurry to mixing for a time sufficient to release bitumen from the tar sands and to uniformly disperse the magnetic surfactant with the bitumen; and subjecting the resulting conditioned slurry to froth flotation for recovery of a bitumen product and productions of sand tails.

The present invention may suitably comprise, consist of or consist essentially of the elements disclosed and may be practiced in the absence of an element not disclosed. For instance, there may be provided a process for separating and recovering bitumen from tar sands which consists essentially of or consists of slurrying about 15 to about 70% by weight tar sands in water at a temperature in the range of from above about freezing to about 35° C. to form an aqueous slurry; mixing said slurry in the presence of a conditioning agent and magnetic nanoparticles to enhance flotation of the bitumen, said conditioning agent having the characteristics selected from the group consisting of kerosene, diesel, a mixture of kerosene/diesel and a frothing agent having the characteristics of methyl-isobutyl-carbinol added in an amount in the range of about 100 to about 800 ppm conditioning agent and 50 to 400 ppm frothing agent; subjecting said slurry to which the conditioning agent has been added to mixing for a time sufficient to release bitumen from the tar sands and to uniformly disperse the conditioning agent and magnetic nanoparticles on the bitumen; and subjecting the resulting conditioned slurry to froth flotation for recovery of a bitumen product and productions of sand tails.

In another non-limiting embodiment there is provided a process for separating and recovering bitumen from tar sands which process consists essentially of or consists of slurrying about 15 to about 70% by weight tar sands in water to form an aqueous slurry, mixing said slurry in the presence of a magnetic substance to enhance flotation of the bitumen, subjecting said slurry to mixing for a time sufficient to release bitumen from the tar sands and to uniformly disperse the magnetic substance with the bitumen; and subjecting the resulting conditioned slurry to froth flotation for recovery of a bitumen product and production of sand tails.

The words "comprising" and "comprises" as used throughout the claims is interpreted to mean "including The words "comprising" and "comprises" as used throughout the claims is interpreted to mean "including but not limited to".

What is claimed is:

1. A cold temperature process for separating and recovering bitumen from tar sands which process comprises:
   slurrying about 15 to about 70% by weight tar sands in water to form an aqueous slurry;
   mixing said slurry in the presence of a magnetic substance comprising magnetic nanoparticles having a continuous encapsulating coating selected from carbon, carbon nitride, silica, and alumina, to protect the nanoparticles and to enhance flotation of the bitumen;
   subjecting said slurry to mixing for a time sufficient to release bitumen from the tar sands and to uniformly disperse the magnetic substance with the bitumen; and
   subjecting the resulting conditioned slurry to froth flotation for recovery of a bitumen product and production of sand tails,
wherein the process temperature is from about freezing to about 35° C.

2. The process as set forth in claim 1 wherein the magnetic substance is added after slurrying the tar sands in water and during mixing of the slurry.

3. The process as set forth in claim 1 wherein the step of mixing the magnetic substance comprises mixing said slurry in the presence of a conditioning agent to enhance flotation of the bitumen, said conditioning agent having the characteristics selected from the group consisting of kerosene, diesel, a mixture of kerosene/diesel and a frothing agent having the characteristics of methyl-isobutyl-carbinol added in an amount in the range of about 100 to about 800 ppm conditioning agent and 50 to 400 ppm frothing agent.

4. The process as set forth in claim 3 further including recovering the magnetic nanoparticles.

5. The process as set forth in claim 3 wherein the magnetic nanoparticles are naturally magnetic.

6. The process as set forth in claim 3 wherein the magnetic nanoparticles are chemically altered to become magnetic.

7. The process as set forth in claim 3 wherein a magnetic substance is added to the tailings following separation of the bitumen in the froth flotation.

8. A cold temperature process for separating and recovering bitumen from tar sands which process comprises:
   slurrying about 15 to about 70% by weight tar sands in water at a temperature in the range of from above about freezing to about 35° C. to form an aqueous slurry;
   mixing said slurry in the presence of a magnetic substance comprising magnetic nanoparticles having a continuous encapsulating coating selected from carbon, carbon nitride, silica, and alumina, to protect the nanoparticles and in an amount effective to enhance flotation of the bitumen;
   subjecting said slurry to which the magnetic substance has been added to mixing for a time sufficient to uniformly disperse the magnetic substance on the bitumen;
   subjecting the resulting conditioned slurry to a magnetic field and froth flotation; and
   recovering a bitumen product from the water,
wherein the process temperature is from about freezing to about 35° C.

9. The process of claim 8 further comprising producing of sand tails.

* * * * *